Patented Oct. 12, 1937

2,095,617

UNITED STATES PATENT OFFICE 2,095,617

PECTOUS MATERIALS

William Abner Rooker, Martinsburg, W. Va., assignor to National Fruit Products Company, Incorporated, Washington, D. C.

No Drawing. Application February 2, 1934, Serial No. 709,508

3 Claims. (Cl. 99—132)

This invention relates to pectous materials and more particularly to an improved process of preparing standardized pectin containing material.

As is known, pectin is the jellifying constituent in fruit, jellies and jams. This material, although relatively recently developed on a commercial scale, has gone into wide use. It occurs widely in the vegetable kingdom. One of the largest sources of pectin raw material is apple pomace, the residue left after extraction of apple juice from the raw apple.

In the ordinary method of manufacturing and marketing pectin at the present time, the fruit, such as apple, is crushed and pressed to express the juice. The residue or pomace is then given a cold water leach to extract sugar and other water solubles, and is then treated with hot acidulated water. The reason for such treatment is that the pectin is relatively insoluble in cold water, but is solubilized in a hot acidic aqueous solution. The pectin containing liquor is thereafter separated from the pulp or residue by filtering or pressing and is then concentrated. The concentrate may be marketed as a liquid pectin. To obtain a dry powdered pectin, the concentrate is treated with a suitable precipitating agent which throws down the pectin. After filtration the precipitated pectin is then dried.

In marketing dried powdered pectin, it is customary to standardize it with sugar. This is necessary in order to produce a pectin product of a standard gel strength. In the ordinary course of manufacture therefore, after a batch of pectin is produced, jelly tests are made to determine the gel strength of that particular pectin. Thus, for example, the pectin obtained from one batch may have a gel strength of say 70; this is a pectin of such setting power, that one pound will set 70 pounds of sugar when combined with the proper proportions of water and acid. On the other hand, another batch of pectin made by the same process may have a higher or lower gel strength. For very obvious reasons, therefore, it is desirable to market a pectin product of a standardized character. This variation in the gel strength of the pectin is inherent in the nature of the raw material, for the quantity of available or extractable pectin varies with the character and maturity of the fruit.

As the industry is conducted today, the pectin in pure form, either in the dry solid condition or as a liquid concentrate, is manufactured at the pectin plant and then shipped to preservers, or in small packages to the household trade. A very large proportion of the pectin produced is used by the preservers in the manufacture of jams, jellies and marmalades. Since the preservers, naturally, are better acquainted with the properties and characteristics of pectin than the householder, it is necessary only that they be provided with available or extractable pectin and not necessarily with the pure pectin. The present invention therefore is based upon the concept of providing a novel source of pectin raw material especially suitable for the wholesale preserving trade. To do this the typical raw material, such as apple pomace, is subjected to a special treatment whereby its physicochemical and physical characteristics are modified so as to make it a more economical and readily workable starting material for the wholesale preserver.

An object of the present invention therefore is to provide an improved type of pectin containing material.

Another object is to provide an improved pectous substance which has been specially treated to render it available for standardized extraction processes at the preserving plant.

Yet another object is to provide as a new product a standardized pectin containing material from which the pectin is readily extractable.

With these and equally important objects in view, the invention comprehends the concept of subjecting the usual pectin containing materials, such as apple pomace, to a special treatment to not only chemically purify it, but also to improve its physical condition rendering it more amenable to subsequent extraction processes; and further, to standardize the purified pectous material so as to facilitate the establishment of extraction control and to insure a uniformity in the final product.

In carrying out the process, apple pomace, either in a fresh wet state, from the cider mills, or in a dry preserved state, is subjected to a purifying step. This may readily be done by treating the pomace with dilute alcohol. As a result of such treatment alcohol soluble substances, such as tannins, sugars, flavors and the like, are removed. The removal of tannins is advantageous because if tannins and starch are present in the final product, as has been the case in the past, these combine in a final jelly to give a cloudy, unsightly product. The treatment with alcohol likewise removes certain constituents of a gummy or waxy nature which tend to impede subsequent filtration operations. The alcohol used for the extraction process may be relatively dilute and if desired may be used at elevated temperature.

After extraction with alcohol the marc or pomace is then reduced in size. The pectin is distributed through the fruit in close association with the cell structure; for example, in the citrous fruit much of the pectin is contained in the albedo. I have found that if the particle size of the pomace is reduced, solubilizing and extraction of the pectin is markedly facilitated. According to the present method therefore the alcohol extracted pomace is ground, preferably to about a 60 mesh. Thereafter the finely divided pectin containing material may be pressed, filtered, or otherwise treated, to remove traces of alcohol.

The product resulting from this treatment comprises essentially purified pectin containing fibers in which the pectin is in a readily extractable condition. As noted above, however, the quantity of available pectin from different batches of apple pomace may vary considerably. It is decidedly advantageous if not commercially essential, to ship the pectin containing material to the manufacturer in a standardized condition. According to the present process the purified pectin containing fibers are standardized with purified depectinized fruit fibers. After analyzing the separate batches of the purified pectin fibers to determine the pectin content, additions of the depectinized fibers are then made to establish a uniform pectous content for a given volume or weight of the product.

The preparation of the depectinized fibers is of course understood by those skilled in the art. A considerable quantity of this material is available at a pectin plant where the purified pectin is made, since it is obtained as a filter press residue.

The ultimate product therefore comprises a quantity of purified pectin containing fibers with a varying quantity of purified depectinized fibers such that the final unit contains a quantity of pectin of a predetermined jellified strength or ability.

Since the product is in finely divided form from which the pectin may readily be extracted, such extraction can most economically be carried out at the preserving plant. This may readily be done by treating a given quantity of the shipped product with a hot acidulating aqueous solution. Due to the improved physical and chemical characteristics of the material, the extractions can be carried out expeditiously and at a minimum temperature. After the material has been treated with the acidulated water at the proper temperature and for the required period of time, the mass is filtered and a maximum amount of the pectin content of the fibers is obtained in the filtrate. Since the material operated upon has been preliminarily purified by extraction of tannins, gums and the like, the filtrate is obtained in highly clarified form. Further due to this preliminary purification treatment, filtration is much more rapidly carried out.

Of course, it will be understood that, if desired, the purified fibers may be subjected to a preliminary cold water leach to extract more of the residual sugars. Likewise, if desired, the usual expedients used in filtration may be availed of; thus, if desired, any predetermined quantity of a suitable filter aid may be added to the mass to improve the filtration step.

After the filtration the clarified filtrate may be concentrated down to the desired strength and consistency, and then used in the preparation of the finished jams and jellies.

It will be observed that operating according to the present process the preserver has only to acidulate his unit mass of the special raw material and is positively assured of a given predetermined jellifying strength or ability in the filtrate. This at the one time eliminates the necessity for a gel test and concomitant adjustments to standardize his pectin and enables the preserver to operate at the maximum speed. The equipment required at the preserving plant involves only a vat or other suitable receptacle for the hot leach and the filtration equipment. These units of equipment are, as a matter of fact, always present in a well equipped preserving plant.

An outstanding advantage of the present process is the very high yield of pectin from a given weight of pomace for, as noted above, not only does the reduction in size of the pomace particles increase the speed of extraction but it also increases the quantity of pectin extracted. The preserver therefore is assured not only of maximum pectin value, from a given mass of pomace, but also of rapid production. Thus, by using such starting material he secures high yields in a shorter time which involve a considerably diminished expenditure due to such factors as the use of filtration, elimination of jelly tests and the like.

It will be understood of course that there is a wide permissive variation in the sequence of steps in the operation as well as materials employed. Thus, for example, instead of using ethyl alcohol as a solvent, other similarly acting material may be employed, such as methyl or butyl alcohol, petroleum ether, sulphuric ether and the like. Also, since many of the undesirable constituents in the raw pomace are water soluble substances, such as fruit sugars and water soluble colors and flavors, economies in the quantity of solvent used may be secured by giving the marc or pomace a preliminary cold water leach. This treatment is optional and is not recommended in all cases. Likewise, if desired, the pomace may be first ground before being subjected to the action of the alcoholic solvent.

While a preferred modification of the invention has been described, it is to be understood that this is given merely to explain the underlying salient features of the improvement. Since the novel results described may be achieved by other specific methods, these equivalent operations are considered to be within the scope of the present invention as defined in the appended claims.

I claim:

1. The process of preparing a pectin containing fruit fibers material which comprises, subjecting fruit fibers containing pectin to the action of an alcoholic solvent, then grinding the fibers and adding thereto a quantity of depectinized fruit fibers, the said quantity being predetermined upon the gel strength of the particular pectin containing fibers in admixture therewith, whereby upon subsequent extraction with an acidulated aqueous medium a pectous extract of predetermined jellifying strength is produced.

2. A method of preparing pectin which comprises subjecting pectin containing fruit fibers to the action of an alcoholic solvent, reducing the fibers to a state of fine subdivision, admixing with the pectin containing fibers a predetermined quantity of depectinized fruit fibers to produce a transportable mass containing potentially extractable pectin of definite and predetermined jellifying ability; then subsequently treating the entire mixture to extract an aqueous pectous solution of predetermined jellifying capacity.

3. A process of preparing pectin which comprises subjecting pectin containing fruit fibers to the action of an alcoholic solvent, reducing the particle size of the fibers, admixing with the finely divided purified fibers a predetermined quantity of purified depectinized fibers to produce, as an article of commerce, a standardized pectin containing mass; then subsequently subjecting the mass to a cold water leach to extract water soluble materials, and subjecting the fibers to the action of a hot acidulated aqueous solution, filtering the mass and concentrating the filtrate, such filtrate being characterized by a predetermined jellifying capacity.

WILLIAM ABNER ROOKER.